United States Patent
Hicks et al.

[11] 3,715,569
[45] Feb. 6, 1973

[54] CREDIT CARD AUTOMATIC CURRENCY DISPENSER

[75] Inventors: John R. Hicks, Duncanville; William C. Bortzfield, Fort Worth, both of Tex.

[73] Assignee: Docutel Corporation, Dallas, Tex.

[22] Filed: July 29, 1970

[21] Appl. No.: 59,241

[52] U.S. Cl..........235/61.11 D, 194/4 R, 235/61.7 B, 340/149 A
[51] Int. Cl..............................G06k 7/08, G97f 1/06
[58] Field of Search......235/61.7 R, 61.7 B, 61.11 D, 235/61.11 R; 340/149 A; 194/4 R

[56] References Cited

UNITED STATES PATENTS

3,443,675    5/1969    Yamamoto et al. ..................194/4 R

OTHER PUBLICATIONS

Landee et al., "Electronic Designers' Handbook," McGraw-Hill, 1957, pages 3-31 to 3-33.

*Primary Examiner*—Maynard R. Wilbur
*Assistant Examiner*—Thomas J. Sloyan
*Attorney*—Richards, Harris & Hubbard

[57] ABSTRACT

A currency dispenser automatically delivers a medium of exchange in packets in response to a coded credit card presented thereto. The coded credit card is presented to the currency dispenser and an initial check is made to determine if the card has the proper format. After checking the credit card format, coded information thereon is evaluated to check the user's identity prior to authorizing him to receive cash from the machine. When each of several additional checks of the credit card code have been completed, the old code is removed and substituted with a new code. The new code contains the same information as the old but updated to reflect an additional currency dispensing transaction. Both the original code and the updated code are scrambled in accordance with a changing key. Scrambling the credit card code after each use thereof minimizes the chance of unauthorized use of the currency dispenser. When the checks of the credit card code indicate the user is entitled to receive the amount of currency he has selected, a storage container for the packets of currency transports the required number of packets by a positive feed drive to a cash drawer. The cash drawer opens to a detent position which allows the customer to then move the drawer to a fully open position to remove his currency. Upon release of the cash drawer, it returns to a partially opened position from which it automatically closes after a preset time limit.

10 Claims, 9 Drawing Figures

PATENTED FEB 6 1973

INVENTORS:
JOHN R. HICKS
WILLIAM C. BORTZFIELD

*Richards, Harris & Hubbard*

ATTORNEYS

INVENTORS:
JOHN R. HICKS
WILLIAM C. BORTZFIELD

Richards, Harris & Hubbard
ATTORNEYS

INVENTORS:
JOHN R. HICKS
WILLIAM C. BORTZFIELD

Richards, Harris & Hubbard
ATTORNEYS

CREDIT CARD AUTOMATIC CURRENCY DISPENSER

This invention relates to a currency dispenser, and more particularly to a coded document actuated currency dispenser.

Recent studies have shown that attempts are being made by the banking system to influence the general public to use fewer checks in their financial transactions. This is primarily due to the difficulty of handling and processing large amounts of paper. In its place, there appears to be a wider use of credit cards for the completion of daily household and business transactions. Although there is a continued heavy use of checks and an increasing use of credit cards, we are not likely to become a cashless society in the near future. To provide the required amount of cash to complete some business and personal transactions, banks, in the past, have opened more and more branches for customer convenience. Unfortunately, the construction and operation of these many branch banks is expensive and unprofitable.

To provide the consumer with a source of ready cash without the expense of branch banking, banks are resorting to the use of automatic currency dispensing machines that make cash available to bank customers on a twenty-four hour basis.

Heretofore, the available automatic currency dispensing machines lacked compatibility with bank credit cards and the convenience and speed of data processing. With many of the prior currency dispensing machines, the customer was required to yield up his identification card with each use, thereby creating handling problems and costs for the bank which were of equal magnitude with the present day check handling problems and costs. Other available machines required the customer to carry a supply of check-like vouchers, which he and the bank must replenish periodically as required. Again, this presented many of the same problems currently experienced when handling checks. Of prime importance, of course, in the operation of any automatic money dispenser is the security of the stored cash. To be acceptable, an automatic cash dispenser must be essentially tamperproof.

An object of the present invention is to provide a coded document activated automatic dispenser. Another object of the present invention is to provide a code actuated automatic currency dispensing machine. A further object of this invention is to provide code scrambling security in a code actuated dispenser. Still another object of this invention is to provide positive feed delivery in automatic dispensing apparatus. A still further object of this invention is to provide controlled, timed, sequential operation of a dispensing drawer in automatic dispensing apparatus.

In an automatic dispenser, a coded document is presented to the machine by a user. Initially, the machine performs a format check on the document to determine if the machine will properly respond. If the coded document presented is not of the correct format, it will be locked out thereby protecting the machine from an attempt to force an unauthorized document into the mechanism. If the initial check indicates the presented document has the proper format, a gate opens to permit the user to further insert the document into the machine for actuation thereof.

Upon the acceptance of a coded document by the dispensing apparatus of the present invention, the document proceeds to a first station where scrambled coded information stored thereon is read and sent to unscrambling logic. A customer's personal identification code as read from the presented document is checked by comparison with a code manually inserted by the user. If the coded customer identification number and the inserted identification number do not agree, the user is instructed to re-enter his personal code. This operation will be repeated until the customer inserts the correct code or a favorable comparison does not result after three attempts. If on the third attempt the stored code and the entered code do not agree, the coded document is transported to an internal storage bin and not returned to the user. When the customer enters an identification code which corresponds to that stored on the document presented, the date of last use, the number of previous uses in the same day, the total number of uses remaining, and the expiration date of the document are all checked. If the result of these checks indicates the user is entitled to receive the article to be dispensed, he is so informed and the document is recoded, with the data thereon updated to reflect the latest transaction.

After the code on the document as presented is read and sent to the unscrambling logic, an unscrambler converts the data into a series of separate, logically arranged data words. These data words, after being checked and updated as explained previously, are rescrambled in accordance with a scrambling key to produce a code arrangement different from the arrangement as read. Upon completion of the rescrambling, the document is recoded with the updated scrambled data. The code changing logic also includes circuitry for generating a different scrambling key for subsequent readings of the same coded documents.

In an automatic dispenser in accordance with the present invention, after the coded document has been returned to a user, a positive feed delivery system removes the article to be dispensed from a storage container. The positive feed system includes an adjustable gate for accurately metering the dispensed article. After leaving the storage container through the metering gate, the article is transported between pinch rollers and a series of belted rollers to a dispensing drawer. This drawer is actuated by an energizing signal from circuitry in response to the user removing the presented document from the machine.

To complete the automatic dispensing operation of the dispenser in accordance with the present invention, an article is deposited into the dispensing drawer. Initially, a signal energizes an actuator to position the drawer from a retracted, closed position to a partially opened detent position from which it may be drawn to a full open position by the user. After the user has removed the article and releases the drawer, it automatically returns to the partially opened detent position. A timer measures the time the drawer is in the detent position, and after a preselected interval, as governed by the timer, it returns to the closed position. If, upon initially positioning the drawer to the partially opened detent position, the user does not pull the drawer to the fully open position before the expiration of a preselected time interval, the drawer will be returned to the closed position.

A more complete understanding of the invention and it advantages will be apparent from the specification and claims and from the accompanying drawings illustrative of the invention.

Referring to the drawings.

GENERAL SYSTEM DESCRIPTION

Figure 1:
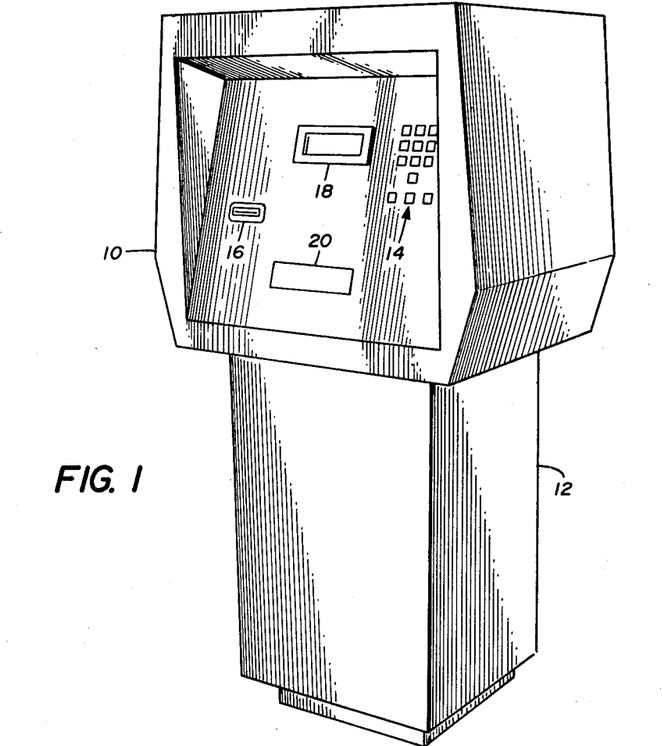
FIG. 1 is a pictorial view of a currency dispenser in accordance with the present invention.

Referring to FIG. 1, there is shown a free standing currency dispenser including a console 10 which houses mechanical operating sections of the system, and in addition customer interface equipment. In the free standing unit, the console 10 is mounted on top of an electric module 12 which houses the system electronics and power supply. On the front panel of the console 10, there is arranged an array of thirteen push button keys 14 for use by a customer to interface with the currency dispenser. Ten of these keys, marked 0 through 9, are to enable a user to insert has assigned identification code for verification of his authority to use a credit card presented to the machine through a card gate 16. One of the remaining three keys is a "-clear" push button for correcting mistakes made by the user in inserting his assigned identification code. The remaining two keys are for selecting one or two currency packages to be dispensed. The amount of currency in each such package is controlled by authorized personnel.

In addition to the thirteen push button keys, and the card gate 16, the front panel of the console 10 includes an instruction window display 18 that provides for viewing an illuminated display message drum. As will be explained, the messages on this drum instruct a user in the operation of the currency dispenser. The last user interface on the front panel of the console 10 is a cash drawer 20 that fits flush with the panel in a closed and locked position.

Figure 2:
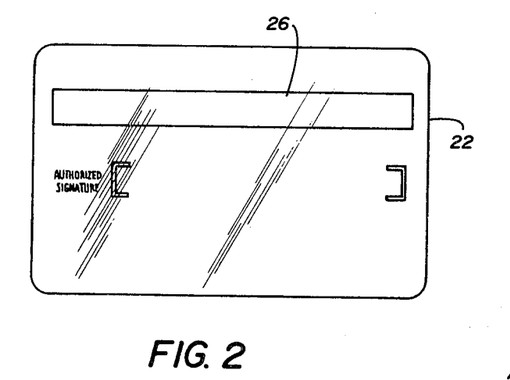
FIG. 2 illustrates a typical credit card for use with the currency dispenser of FIG. 1.

Upon presentation of a credit card 22, such as illustrated in FIG. 2, through the card gate 16 to the console 10, it is transported to a plurality of reading stations by a card reader 24 to activate the various systems in a preordered sequence. Typically, a currency dispenser in accordance with the present invention may be activated by a standard "A" size plastic credit card with a stripe 26 of magnetic material located on the backside. The magnetic stripe allows up to eighty numeric characters in four rows to be magnetically encoded for use in providing a complete identification and record of each transaction with the currency dispenser. A magnetic credit card for use in the system described contains the following information:

a — Expiration Date (Year [two digits] and Month [two digits]),
b — Total Allowed Uses (Up to 999 [3 digits]),
c — Allowed Uses Per Day (Up to 9 [1 digit]),
d — Account Number (Variable from 6 to 14 digits),
e — Customer Identification Code (6 digits),
f — Bank Routing and Transit Number (8 digits),
g — Date Last Used (Month [two digits], Day [two digits]), and number of times used per day (one digit),
h — Bank Identification Number (4 digits), and
i — Bank Branch Number (3 digits).

As the credit card 22 moves through the card reader 24, each of the above pieces of information is checked at one of several reading stations. Although many credit card readers are available, the card reader illustrated includes a drive motor 27 activated by a signal from the electronic module 12 and coupled to a series of drive rollers through a belt 28. The series of rollers comprises pinch roller pairs distributed longitudinally along the length of travel of a credit card. In addition to reading stations responsive to the magnetically coded information on the stripe 26, the card reader 24 also includes writing stations for recoding a credit card during completion of a currency dispensing operation.

In the normal currency dispensing cycle, a credit card is transported through the card reader 24 in one direction during a first part of a sequence and then returned to the user through the card gate 16 at the second-to-last step in the completion of a cycle. Under certain circumstances, a credit card presented to the machine is retained and not returned to the user. A card retained by the machine is transported through the card reader 24 into an internal storage bin 30. This bin is accessible only to authorized persons having access to the inside of the console 10.

Figure 3:
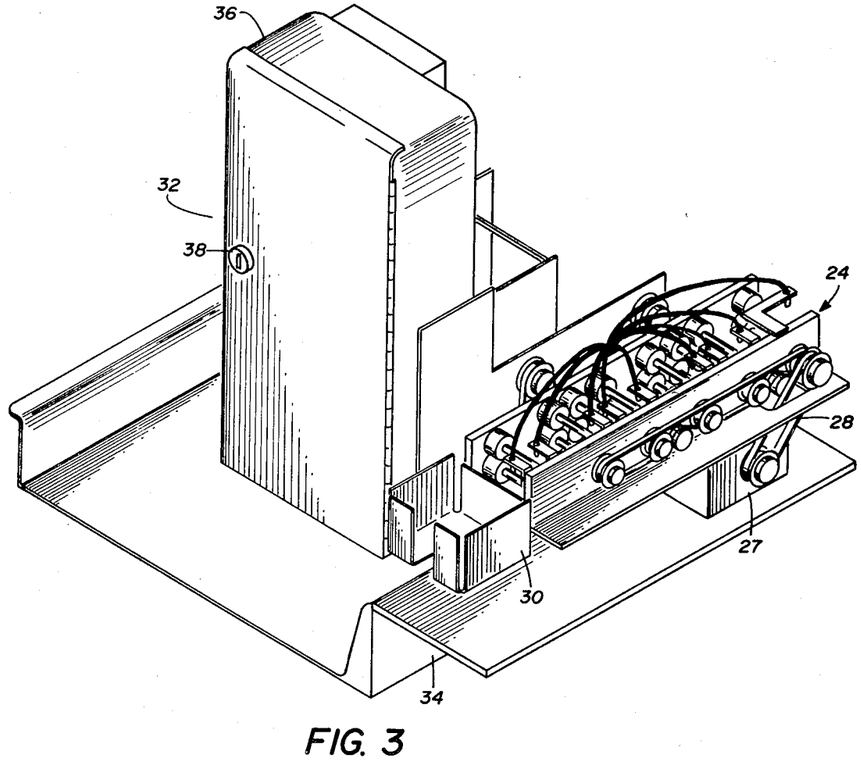
FIG. 3 is a perspective view of a currency packet delivery system and credit card transport system for the dispenser of FIG. 1.

After several verification steps have determined a user is entitled to the currency he has requested, a cash transport 32 is activated by a signal from the electronic module 12 to deliver packets of currency to the cash drawer 20. As illustrated in FIG. 3, the cash transport 32 is mounted alongside the card reader 24 on an equipment rack 34 contained within the console 10. Currency to be dispensed is stored in a cabinet 36 having an opening for feeding packets of currency to a money transport system, as will be explained. Although the console 10 contains security locks to restrict unauthorized entry into the unit, the cabinet 36 also includes a lock 38 for securing money packets stored within the cabinet.

Figure 4:
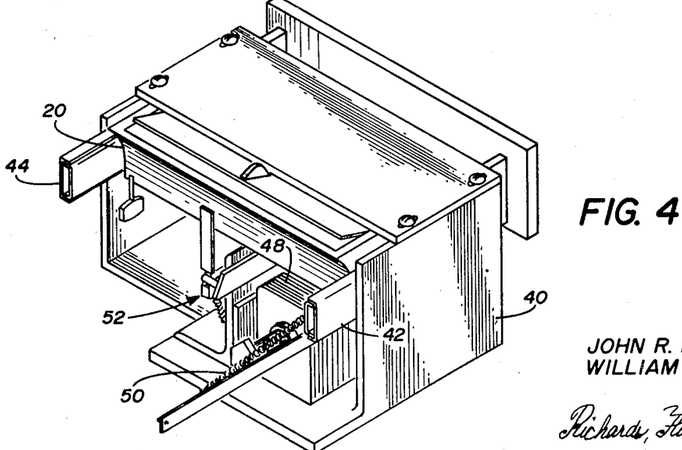
FIG. 4 is a perspective view of the cash drawer for the dispenser of FIG. 1.

Money packets delivered from the cash transport 32 in response to instructions from the electronic module 12 are delivered to the cash drawer 20 included as part of a separate subsystem as illustrated in FIG. 4. The cash drawer 20 is contained within a housing 40 and moves between a closed position as illustrated in FIG. 1 to a partially opened position as illustrated in FIG. 4 along tracks 42 and 44. In addition to numerous switches for sensing the operation of the cash drawer 20, the housing 40 contains a linear motor 48 for forcing the drawer from a closed position to a detent position, as will be explained. Upon receipt of a control signal from the electronic module 12, a latch solenoid is energized and allows a spring 50 to return the drawer 20 to the closed position. A latch mechanism, generally indicated by the numeral 52, locks the drawer 20 in the closed position.

GENERAL SYSTEM OPERATION

In operation of the console 10 and the electronic module 12 to dispense currency to a user, the display 18 instructs a customer to insert his credit card into the card gate 16. This is the first step in a sequence of step-by-step operating instructions leading to a completed transaction.

A second instruction appearing at the display 18 instructs a user to key-in his identification code. This requires that the customer's personal identification number be entered by means of the numbered push button keys 14. By operation of the electronic module 12, the keyed-in number is verified with the number magnetically encoded on the stripe 26 of the customer's credit card 22. If the wrong keys are accidentally pressed before completing a number, the "-clear" key is provided to allow the user to try again. On the third incorrect attempt at verification, the card reader 24 delivers the inserted credit card to the bin 30. (This feature is a safeguard against the use of lost or stolen cards.) In this situation, an instruction will appear at the display 18 telling a customer his card has been retained. A printed receipt is then issued telling the user why his card has not been returned.

Following verification, the message "Key In Amount Desired" appears in the lighted display 18. The user now selects one of two fixed amounts, prepackaged in the cash transport 32, by means of one of two currency-amount key push buttons 14. The requested cash amount is delivered to the cash drawer 20 along with a receipt of the transaction. A receipt is printed and issued to a user upon the termination of each transaction whether the transaction has been completed by the dispensing of currency or by a machine detected error. In the latter situation, the receipt explains to the user why currency was not dispensed.

Upon delivery of the currency and the receipt to the cash drawer 20, the electronic module 12 generates a signal to automatically open the cash drawer to a detent position for delivery of the cash and receipt to the user. The cash drawer 20 must be manually extended to facilitate removal of its contents, after which it is automatically retracted and locked by means of the spring 50 and the latch 52. Upon completion of the latching of the drawer 20, the transaction has been completed and the machine is ready for a subsequent transaction.

DETAILED OPERATING SEQUENCE

Figure 5:
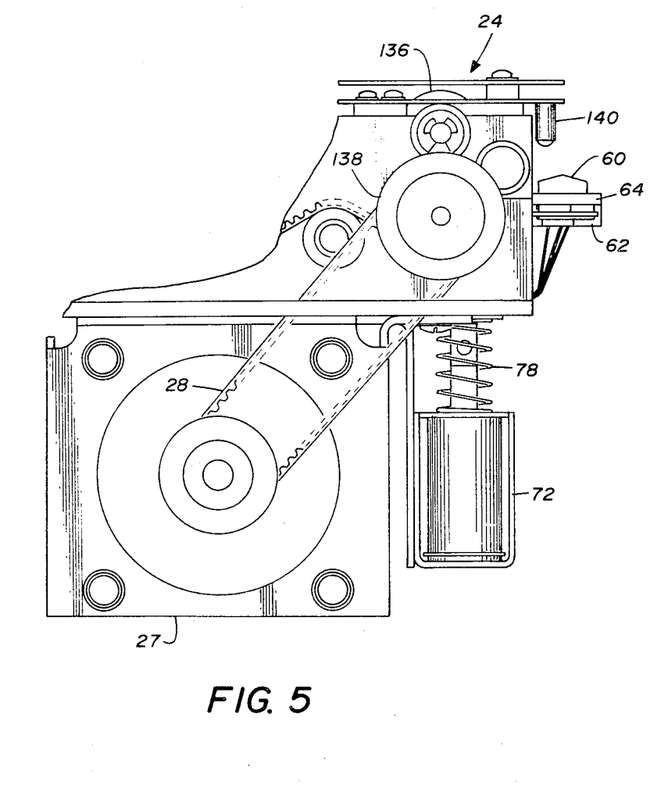
FIG. 5 is a side view partially cutaway of the card transport system including a magnetic card sensor and gate.
Figure 6:
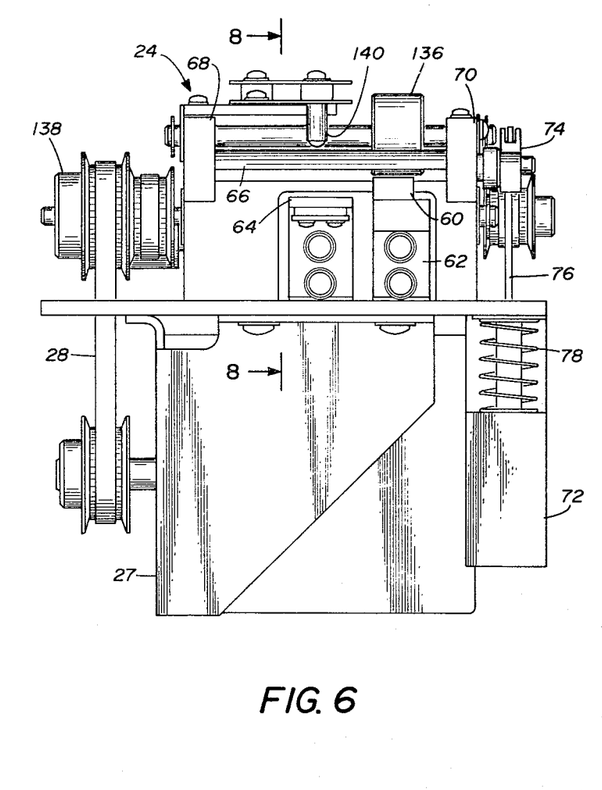
FIG. 6 is a front view of the card transport system of FIG. 3.
Figure 7:
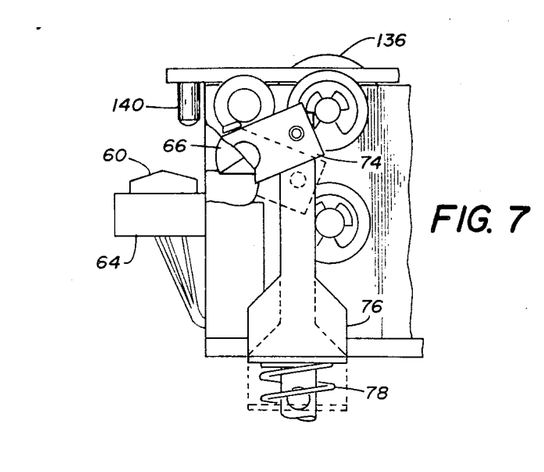
FIG. 7 is a side view partially cutaway as viewed from line 7—7 of FIG. 6.
Figure 8:
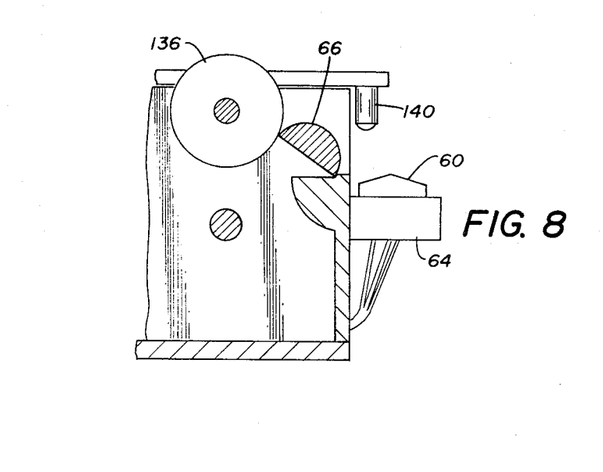
FIG. 8 is a sectional view partially cutaway taken along the line 8—8 of FIG. 6.

For a detailed operation of the step-by-step sequence of the currency dispenser, reference is made to FIGS. 5 through 7.

In the initial state (ST1) of the currency dispenser, message No. 1 of Table I will appear at the display 18. Electronic module 12 activates an inquiry 54 to determine if a card has been inserted through the gate 16 after the card format has been checked.

TABLE I

DISPLAY MESSAGES

1. Insert Card
2. Enter I.D. Code
3. Enter I.D. Code Again
4. Card Has Expired
5. Uses Per Day Exceeded
6. Select Amount Desired
7. Transaction Not Complete — Bank will contact you
8. Receipt Being Printed
9. Remove Card
10. Remove Currency and Receipt
11. Remove Receipt
12. Out of Order Upon a positive response from the inquiry 54, the sequence proceeds to state ST2. In state ST2, the card reader 24 positions the advancing credit card, and the module 12 completes step 56 to read the scrambled data from the inserted card, check the parity, and store the data read from the stripe 26. State ST2 continues with the inquiry 58 to determine if a parity error exists. A positive response to the inquiry 58 advances the sequence of state ST2 to step 60 and then to inquiry 62. A "yes" response to inquiry 62 advances state ST2 to step 64 to cause message 7 of Table I to appear at the display 18. Step 64 also advances the sequence of operation to state ST10; state ST10 will be explained shortly. A "no" response to inquiry 62 returns state ST2 to step 56 and in turn to inquiry 58.

Step 64 makes a check to determine the number of times a parity error has produced a "yes" response to the inquiry 64. If the number of times step 64 has been reached equals an internally set limit, error counter No. 1 of Table 2, then the machine will terminate the present transaction and shut down. For error counter No. 1, on the seventh attempted successive use of the machine which results in a "yes" response to inquiry 62, the machine will shut down. After each successful completion, however, the error counter will reset to zero.

TABLE II

ERROR COUNTER LIMITS

| Counter No. | Limit |
|---|---|
| 1. Parity Error | 6 |
| 2. Invalid I.D. Code | 3 |
| 3. Invalid Bank Code | 6 |
| 4. Expired Card | 3 |
| 5. Total Uses Exceeded | 6 |
| 6. Too Much Time Used To Key In I.D. Code | 3 |
| 7. Uses Per Day Exceeded | 6 |
| 8. Too Much Time Used To Select Amount | 2 |
| 9. Echo Check Error | 3 |
| 10. Drawer Did Not Open | 2 |

A negative response to the "parity error" inquiry 58 advances the sequence of operation to state ST3. Initially, in state ST3, message No. 2 of Table I appears at the display 18. Simultaneously, a thirty second timer, step 66, is initiated by the electronic module 12. Message No. 2 instructs a user to enter his personal identification number into the machine by means of the push button keys 14. When the user is inserting his personal identification number into the machine, the sequence of operation advances to inquiry 68 to determine if the thirty second limit of step 66 has been exceeded. A "no" response to inquiry 68 advances state ST3 to inquiry 70 to determine if a user's identification code has been entered. If the response to inquiry 70 is "no," the sequence returns to inquiry 68. Inquiries 68 and 70 are continually repeated until either one or the other produces a "yes" response.

A positive response from inquiry 70, indicating that a code has been entered, advances state ST3 to step 72 wherein the scrambled coded data, as read from the magnetic stripe 26, is unscrambled. After unscrambling the data from the stripe 26, the sequence advances to step 74 wherein a comparison of the customer-entered identification code with the card identification code is made. Upon completion of the comparison step 74, the electronic module 12 advances the sequence to inquiry 76 to determine if the customer-entered code and the code read from the magnetic stripe 26 are identical. A "no" response to inquiry 76 advances state ST3 to step 78 and causes message No. 3 of Table I to appear at the display 18. State ST3 is also advanced to this same position upon a "yes" response to inquiry 68 indicating that the thirty second timer 66 has timed out.

Step 78 is completed by the electronic module 12 to determine the number of times an incorrect identification code has been entered by the user. This determination is checked by inquiry 80. Upon the first entering of an incorrect identification code by a user, inquiry 80 produces a positive response advancing state ST3 to step 82 which starts a ninety second timer. At this time, the user is instructed to re-enter his identification code through the push button keys 14 in response to message No. 3 appearing at the display 18. The cycle of operation continues at inquiry 84 with the sequence being continuous between step 82 and inquiry 84. A "no" response to inquiry 84 advances the sequence to inquiry 86 to determine if an identification code has been entered. Inquires 84 and 86 are continuously cycled until either one or the other produces a "yes" response.

A "yes" response to inquiry 84 indicates that the ninety second timer 82 has timed out and state ST3 advances to step 88. Upon completion of step 88, the sequence advances to state ST10 and the transaction is terminated. As a result of state ST3 advancing to step 88, message No. 7 of Table I appears at the display 18.

Step 88 checks to determine how many previous cycles, i.e., previous uses of the machine, have advanced to that point as a result of timing out of the ninety second timer. When the number of times the sequence has advanced to step 88 equals a set error number, the machine will terminate the present transaction and shut down. For a time out error, the machine will shut down after the fourth sequence, error counter No. 6 of Table II, in succession has advanced to step 88 as a result of the 90 second timer timing out.

A "yes" response to the inquiry 86 advances state ST3 to step 90 wherein the data read from the magnetic stripe 26 and stored in step 56 is unscrambled. After completing the unscrambling step 90, the sequence advances to step 92 where the entered identification code and the unscrambled code are compared. This advances state ST3 to inquiry 94 which is made to determine if the user-entered code and the credit card code favorably compare.

A "no" response to the inquiry 94 returns state ST3 to step 78. Inquiry 80 is again made and the response this time will be negative, advancing state ST3 to inquiry 96. This being the second attempt to insert the correct identification code, inquiry 96 produces a "yes" response advancing state ST3 to step 98 which causes the display 18 to flash message No. 3 and return the sequence to the ninety second timer, step 82. The sequence of steps of inquiries 84 through 94 are repeated. Another "no" response to inquiry 94 again returns the sequence to step 78 and inquires 80 and 96 are again made. At this time, inquiry 98 will result in a "no" response advancing state ST3 to step 100. In step 100, the electronic module 12 makes an error limit check to determine how many times state ST3 has advanced to this position. When the number to times that state ST3 has advanced to step 100 equals a stored limit, the machine will shut down upon completion of the present transaction. For step 100, the error counter No. 2 of Table II gives the number of successive times an incorrect I.D. code will shut down the machine. The present transaction advances to state ST10 and message No. 7 of Table I appears at the display 18. If this is not the fourth successive attempt to use the machine, the present transaction will be terminated and the machine will be returned to the initial state.

A positive response to either inquiry 76 or inquiry 94, indicating a valid code has been entered through the push button keys 14, advances the transaction to step 102 of state ST4. In step 102, the module 12 compares the bank code read from the magnetic stripe 26 of the inserted credit card, after unscrambling, with a bank code stored in the module 12. Upon completion of step 102, state ST4 advances to inquiry 104. A "no" response to inquiry 104 advances the sequence to step 106 and message No. 7 of Table I appears at the display 18. Step 106 compares the number of times the overall sequence has advanced to that state with a preset limit, error counter 3 of Table II. If the number of times the sequence advances to step 106 does not equal the stored limit, the sequence advances to state ST10 and completes the transaction. If the error limit plus one has been reached, the machine will shut down.

A "yes" response to inquiry 104 completes state ST4 and advances the sequence to state ST5. Initially, in state ST5, step 108 is completed. Step 108 is a further check on the data read from the magnetic stripe 26. Step 108 compares the expiration date of the credit card with the calendar date. Inquiry 110 is made and a positive response advances state ST5 to step 112 and message No. 4 of Table I appears at the display 18. In step 112, the module 12 determines the number of times the sequence has advanced to this point, error counter 4 of Table II. If the sequence advances to step 112 once more than the number of times as stored in the module 12, the sequence advances to state ST10 and shuts down. If there has been three or less successive sequences advanced to step 112, the present transaction will be completed and the machine returned to the initial state. A "no" response to inquiry 110 completes state ST5 and advances the operation to state ST6.

In state ST6, the first operation, step 112, compares the calendar date with the date of last use as read from the magnetic stripe 26. If the calendar date does not agree with the date of last use, indicating the card has not been used that day, inquiry 114 results in a "no" response and state ST6 advances to step 116. Step 116 stores the calendar date in a memory of the electronic module 12 for subsequent encoding on the magnetic stripe 26. Upon completion of storage of the calendar date, state ST6 advances to step 118. Step 118 sets a use counter to 1 and stores this information in a memory for subsequently encoding on the magnetic stripe 26.

A "yes" response to the inquiry 114, indicating that the card has been previously used on the calendar date, advances the sequence from state ST6 to state ST7. In state ST7, step 120 compares the number of uses made for that day with an established use limit. If the number of uses of the card in the card reader 24 equals the established limit, an inquiry 122 results in a "yes" response thereby advancing state ST7 to step 124 and message No. 5 of Table I appears at the display 18. In step 124, the electronic module 12 compares the number of times the sequence has advanced to that point with a stored number, error counter 7 of Table II. If state ST7 advances to step 124 by an amount equal to the stored limit plus one, indicating seven successive uses of the machine have advanced the sequence to step 124, the machine will complete the present transaction by advancing to state ST10 and then shut down. If less than seven successive uses has advanced the sequence to step 124, the present transaction will be completed through state ST10 and the machine returned to the initial state.

A "no" response to inquiry 122 advances state ST7 to step 126 which adds another use to the total number of uses per day and stores this information for subsequent encoding on the magnetic stripe 26.

Upon completion of either step 118 of state ST6 or step 126 of state ST7, the machine operation advances to state ST8, as appears in FIG. 6. Initially, in state ST8, step 128 compares the number of total uses made of the credit card with the total number of allowed uses. Note that this is not the uses allowed per day, but rather the total number of uses that can be made of a credit card. If the number of total uses remaining equals zero, an inquiry 130 results in a "yes" response advancing state ST8 to step 132 and causing message No. 7 of Table I to appear at the display 18. In step 132, the electronic module 12 checks to determine the number of times state ST8 has advanced to this point, error counter 5 of Table II. If it has advanced to the total number of times allowed, the sequence will advance to state ST10 and complete the present transaction by retaining the card and printing a receipt advising the user his card has been retained. A "no" response to the inquiry 130 indicates that another use of the credit card 22 remains and state ST8 advances to step 134. Step 134 reduces the total number of remaining uses by 1 and advances the sequence to state ST9.

Initially, in state ST9, message No. 6 of Table I appears at the display 18 and the thirty second timer of step 136 and the ninety second timer of step 138 are activated. Electronic module 12 monitors both the ninety second timer, step 138, and the thirty second timer, step 136, by inquiries 140 and 142, respectively. Inquiry 140 checks the ninety second timer of step 138. If the ninety second timer has timed out, inquiry 140 results in a "yes" response advancing state ST9 to step 144 and causing message No. 7 to appear at the display 18. Step 144 is one of those that checks the operation of the complete system. In step 144, the module 12 evaluates the number of times the ninety second timer has timed out, error counter 8 of Table II. If the number of times step 144 has been reached equals the number stored in the module 12 plus one, the machine will complete the present transaction and shut down. If the limit has not been reached, the present transaction will be completed and the machine returned to the initial state. The present transaction is completed by advancing the sequence from step 144 to state ST10.

A "no" response to the inquiry 140 advances state ST9 to inquiry 142 which checks the thirty second timer, step 136. If the thirty second timer has timed out, inquiry 142 produces a "yes" response thereby initiating step 146 which produces a flashing display 18. The message at 18 will be to instruct the user to select the amount of currency desired to be dispensed. Upon either a "no" response to the inquiry 142 or upon completion of step 146, state ST9 advances to the inquiry 148. If an amount of currency to be dispensed has not been selected by the user, inquiry 148 results in a "no" response thereby returning the sequence to inquiry 140. After a user has selected the amount of currency to be dispensed, the inquiry 148 produces a "yes" response and state ST9 advances to step 150. Step 150 activates the cash transport 32 to deliver the number of required currency packets to the cash drawer 20. After delivery of the currency packets to the cash drawer 20, state ST9 is completed and the sequence advances to state ST10.

Initially, in state ST10, message No. 8 of Table I appears at the display 18 and step 152 is completed. In step 152, the electronic module 12 activates a receipt printer to generate a receipt of the transaction. This receipt is transported to the cash drawer 20 in step 154. Upon completion of step 154, state ST10 advances to inquiry 156. Inquiry 156 is made to determine if state ST10 has been reached through states ST1 to ST10 in a normal sequence, or whether an error has advanced the sequence, out of order, to state ST10. In the latter situation, when an error has advanced the sequence to state ST10, the sequence advances to inquiry 158. Inquiry 158 is made to determine whether the error requires the capture of the credit card in the reader 24. A "yes" response will result from inquiry 158 when (1) three attempts have been made to insert an identification code, all of which were erroneous, (2) the expiration date of the card has passed, or (3) the total number of uses has been reached. The result of a "yes" response to inquiry 158 advances the sequence to step 160 wherein the electronic module 12 activates the card reader 24 to deliver the card to the storage bin 30. After completion of step 160, the sequence advances to state ST14, shown in FIG. 7.

If the sequence of operation of the machine has advanced to state ST10 through a normal operating cycle, the inquiry 156 produces a "no" response. This completes state ST10 and advances the operation to step 157 of state ST11. A "no" response to the inquiry 158 also completes state ST10 and advances the sequence to state ST11. The only step completed in state ST11 is that of rescrambling the data to be stored on the magnetic stripe 26.

Upon completion of the scrambling technique, the sequence advances to state ST12 wherein step 162 encodes the magnetic stripe 26 with the scrambled updated data. Step 162 comprises the entire operation of state ST12; upon completion of the encoding of the credit card, the sequence advances to state ST13.

In state ST13, the first operation, step 164, reads the encoded card to check the parity and compare the updated data with data stored in memory in the electronic module 12. Upon completion of step 164, inquiry 166 is made to determine if there are any parity errors. A parity error produces a "yes" response to inquiry 166 and advances the sequence to step 168. Step 168 is an error determining step for checking the overall operation of the machine, error counter 9 of Table II. When the state ST13 has reached step 168, the module 12 checks to determine how many previous occasions this step has been reached. If it equals a preset number of times plus one, four in this case, the sequence advances to complete the present transaction and the machine shuts down. Step 168 will be reached if the result of inquiry 168 is positive or if the inquiry to 170 is negative. Inquiry 170 is made when the inquiry 166 results in a negative answer.

A positive response to the inquiry 170 completes state ST13 and advances the sequence to state ST14, FIG. 7. Upon reaching state ST14, message No. 9 of Table I appears at the display 18 and a return card step 172 is completed. The return card step 172 is performed by the card reader 24 giving the user access to his credit card through the card gate 16. Upon returning the credit card 22 to the card gate 16, a thirty second timer of step 174, and a ninety second timer of step 176, are activated. Following activation of these timers, an inquiry 180 is made to determine if the ninety second timer has timed out before the user removes his card. If the inquiry 180 produces a "yes" response indicating that the ninety second timer of step 176 has timed out, the remainder of state ST14 is bypassed and the sequence advances to state ST15.

A "no" response to the inquiry 180 indicates that the ninety second timer is still running and the sequence advances to the inquiry 182. Inquiry 182 is made to determine if the 30 second timer of step 174 has timed out. A "yes" response to the inquiry 182 advances the sequence to step 184. In step 184, the electronic module 12 flashes message No. 9 of Table I on the display 18 in an effort to attract the user's attention. Upon completion of step 184, that is, flashing the display 18, the sequence of state ST14 advances to inquiry 186. State ST14 also advances to inquiry 186 upon a negative response from the inquiry 182.

INquiry 186 is made to determine if the user has removed his credit card from the card gate 16. A "no" response to this inquiry returns the sequence to inquiry 180. A positive response to the inquiry 186, indicating that the user has removed his credit card, advances the sequence to inquiry 188. Inquiry 188 is also activated upon a positive response to the inquiry 158 of state ST10. A positive response to inquiry 188 causes message No. 11 of Table I to appear at the display 18 and a negative response to this inquiry causes message No. 10 of Table I to appear at the display 18. In either case, state ST14 advances to step 190. In step 190, the electronic module 12 activates the latch 52 and energizes the linear motor 48 to position the cash drawer 20 to the detent position. At the same time a thirty second timer of step 192 is activated. Inquiry 194 is made as a check to determine when the timer of step 192 has timed out. A negative response to step 194 advances the sequence of state ST14 to inquiry 196. Inquiry 196 is made to determine if the cash drawer has been extended to facilitate removal of its contents. A "no" response to inquiry 196 returns the sequence to inquiry 194. A "yes" response to inquiry 196 advances the sequence of state ST14 to step 198.

State ST14 also advances to step 198 upon a positive response to the inquiry 194. Such a response advances the sequence to step 200 which is a flashing light operation to cause the display 18 to flash either message No. 10 or message No. 11. After the flashing operation has commenced, inquiry 202 is made to determine if the cash drawer 20 has been extended to remove the contents thereof. A "no" response to the inquiry 202 advances the sequence to step 204 which is an error counter operation. In step 204, the electronic module 12 checks to determine in how many successive sequences has the drawer not been opened after advancing to this step. If the step 204 has been activated a number of times equal to a preset value stored in the electronic module 12, error counter 10 of Table II, the system will complete the present transaction and shut down.

Upon a "yes" response to the inquiry 202 or upon a completion of the step 204, state ST14 advances to step 198. Step 198 includes a five second timer for timing how long the cash drawer is held in the detent position after being manually extended. Upon starting the five second timer of step 198, inquiry 201 is made to check the operation of the timer. A "no" response to the inquiry 201 indicates that the five second timer has not timed out and inquiry 201 is continuously made until a positive response results.

A positive response to the inquiry 201 advances the sequence to step 202 which activates the latch 52 to allow the spring 50 to automatically retract the cash drawer 20. A latch then locks the cash drawer 20 until the next transaction.

Upon completion of the step 202, an inquiry 204 is made. Inquiry 204 is made to determine if any of the error counter steps have been activated. If any of the error counting steps have been activated, the inquiry 204 produces a positive response.

A positive response to the inquiry 204 completes state ST14 and advances the sequence to state ST15. The sequence of state ST15 is also initiated as the result of a positive response to the inquiry 180 of state ST14. Initially, message No. 12 of Table I appears at the display 18 and a step 206 is activated to start a six second timer. The entire purpose of state ST15 is to display message No. 12 and turn off the display lights. This state includes inquiry 208 which cycles until the timer of step 206 has timed out. At that time, the inquiry 208 produces a "yes" response thereby activating step 210 to turn off the display lights. State ST15 is completed by inquiry 212 and step 214.

If the inquiry 204 results in a negative response, indicating that currency was dispensed without activating any of the error counting steps, the sequence advances to state ST16. State ST16 is a state in which the machine resets itself in preparation for another cycle.

Initially, in state ST16, an inquiry 216 is made. A positive response to inquiry 216 activates step 218 and a negative response activates step 220. Both steps 218 and 220 ready the console 10 for inquiry 54 of state ST1.

MAGNETIC CONTROLLED GATE

Referring to FIGS. 5 – 8, to initiate the operation of the illustrated dispenser, the credit card 22, (FIG. 2), having the magnetic stripe 26 thereon, is inserted through a receiving throat of the gate 16 (FIG. 1). Upon entering the receiving throat, the credit card 22 passes over the magnetic card sensor 60 mounted to a bracket 62 of the supporting frame of the card handler 24. The leading edge of the advancing credit card also interrupts a light beam to a photocell 64 mounted below a light source 140. Next in the credit card path, a gate 66 blocks the card passage to the card handler when a closed position. As illustrated, the gate 66 is mounted to the supporting structure of the card handler 24 by means of bearing blocks 68 and 70.

The gate 66 is in the form of a half circle and rotates from the position illustrated in FIG. 7 to the position shown in FIG. 6 by means of a solenoid 72 mounted to the supporting structure of the card handler 24 and energized by a signal from the control module 12. To operate the gate between its opened and closed positions, the solenoid 72 is connected to a gate linkage assembly including a crank arm 74 and a push rod 76. Normally, the gate 66 is biased into the closed position by means of a spring 78.

Figure 9:
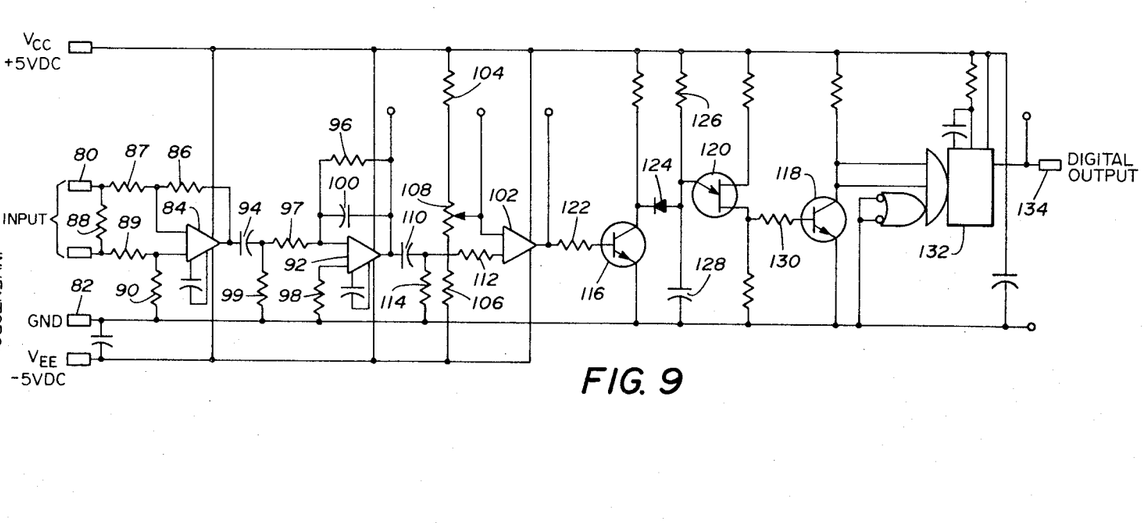
FIG. 9 is a schematic of an amplifier for a magnetically controlled card gate.

In the operation of the gate 66, a credit card is inserted through the receiving throat of the gate 16 such that a magnetic stripe thereof is oriented to pass over the magnetic sensor 60. This sensor is connected to the input of a two stage amplifier as illustrated in FIG. 9. Thus, a pulse produced at the magnetic sensor 60 is applied to input terminals 80 and 82 of an amplifier stage 84. The amplifier stage 84 has an external resistance network connected thereto including resistors 86 – 90, and is capacitor coupled to an amplifier stage 92 by means of a capacitor 94. Amplifier stage 92 also has a resistance network connected thereto that includes resistors 96 – 99. Resistor 96 forms a part of a feedback network including a capacitor 100.

An output voltage from the amplifier stage 92 is applied to the input of a level detector amplifier 102 which has a second input connected to a level adjusting circuit consisting of fixed resistors 104 and 106 along with a variable resistor 108. The coupling circuit between the amplifier stage 92 and the amplifier 102 includes a coupling capacitor 110 and resistors 112 and 114.

An output from the amplifier 102 is applied to a pulse width detector circuit including transistors 116 and 118 along with a unijunction transistor 120. A resistor 122 interconnects the transistor 116 to the output of the amplifier 102 and a diode 124 functions as a coupler between the output of the transistor 116 and the emitter of the unijunction transistor 120. The unijunction transistor 120 has a timing circuit connected thereto that includes a timing resistor 126 and a timing capacitor 128. An output pulse at the base-one of the transistor 120 is applied through a resistor 130 to the transistor 118 which has an output applied to a control logic circuit. The control logic circuit includes a flip-flop 132 which generates an output pulse for energizing the solenoid 72.

A pulse from the magnetic sensor 60 is amplified by the stages 84 and 92 to a level that varies as a function of the speed of credit card 22 as it moves through the receiving throat of the gate 16. This voltage is further amplified by the level detector amplifier 102 and applied to the pulse width detector circuit. Any pulse from the amplifier 102 in excess of a preset timed duration, is passed by the pulse width detector circuit to trigger the one-shot multivibrator 132. Triggering of the one-shot multivibrator 132 generates a solenoid energizing pulse at an output terminal 134.

Upon energization of the solenoid 72, the connecting rod 76 exerts a downward force on crank arm 74 to rotate the gate 66 in the bearing blocks 68 and 70 thereby opening a passage into the card transport 24. A user then exerts additional pressure on his credit card until it engages the first pinch roller pair 136 of the card handler mechanism. This first pinch roller pair is driven by the motor 27 through the timing belt 28 connected to a pulley 138. To energize the motor 27, the leading edge of the credit card 22 interrupts a light beam from the light source 140 to the photocell 64. After the gate 66 has been opened and the card received by the first pinch roller pair 136, the card transport carries the card to the first reading station to start the cash dispensing sequence. The length of time the gate 66 remains in the open position is controlled by the pulse duration of the output of the multivibrator 132.

Should a user insert a credit card into the gate 16 such that the magnetic stripe is to the left of the magnetic sensor 60, the sensor will not respond to produce a pulse of sufficient magnitude to operate the amplifier of FIG. 9. Thus, the solenoid 72 will not be energized and the gate 66 will remain in the closed position. This same card lockout will occur if an attempt is made to use a credit card not containing a magnetic stripe.

Another situation wherein the gate 66 remains closed occurs when the user inserts his credit card containing a magnetic stripe upside down through the gate 16. In this situation, even though the magnetic stripe may be positioned over the sensor 60, the sensor will not receive a sufficient level of magnetic flux to actuate the amplifier of FIG. 9. This card position selection is accomplished by adjusting the variable resistor 108. Adjustment of the variable resistor 108 provides that the credit card must be in a preferred orientation before tripping the one-shot multivibrator to energize the solenoid 72. This not only prevents the forcing of cards of the wrong format into the system, but also insures that the magnetic stripe, with the information contained thereon, is properly oriented for reading in the card handler 24.

The cash transport system described herein is further described and claimed in the co-pending application Ser. No. 58,888, filed 7/28/70, of Marion R. Karecki, George R. Chastain and Thomas R. Barnes.

The method of unscrambling data in accordance with coding keys and rescrambling data in accordance with other coding keys described herein is described and claimed in U.S. Pat. No. 3,662,343 of Kenneth S. Goldstein and John D. White.

The cash drawer of the dispensing system described herein is described and claimed in U.S. Pat. No. 3,651,986 of Marion R. Karecki and Thomas R. Barnes.

A system for sequencing the operation of the cash dispenser described herein is described and claimed in the co-pending application Ser. No. 59,150, filed 7/29/70, of Thomas R. Barnes, George R. Chastain and Don C. Wetzel.

While only one embodiment of the invention, together with modifications thereof, has been described in detail herein and shown in the accompanying drawings, it will be evident that various further modifications are possible without departing from the scope of the invention.

What is claimed is:

1. In a dispensing system wherein a manually inserted magnetically coded card actuates a dispensing mechanism, the combination comprising:
   a card sensor located at a receiving throat of the dispensing system, the sensor being responsive to a changing magnetic flux generated by manually inserting the encoded card through the receiving throat and to thereby provide a dynamic card signal,
   a level detector responsive to the card signal and generating an output pulse having a time duration directly related to the rate of change of magnetic flux at said card sensor,
   a pulse width detector connected to said level detector and responsive to the output thereof for generating a trigger pulse when the output pulse of said level detector exceeds a preset time duration,
   an entry gate at said receiving throat restricting the manual insertion of a card into the dispensing system when in a closed position and passing a card into the system when in an opened position as achieved in response to a dynamic sensing of the card movement relative to the card sensor, and
   motor means coupled to said entry gate and responsive to the trigger pulse to operate said gate between the closed and opened position thereof to thereby open a passage into a card transport of the dispensing system.

2. In a dispensing system as set forth in claim 1 including amplification means responsive to the rate of change of magnetic flux at said card sensor and providing a signal to said level detector that varies as a function of the speed of the encoded card moving through the receiving throat.

3. In a dispensing system as set forth in claim 1 including means for adjusting the level of the time duration to which the level detector responds to generate an output pulse.

4. In a dispensing system as set forth in claim 1 wherein said motor means includes:
   a solenoid coupled to said entry gate and responsive to an energizing pulse, and
   a one-shot multi-vibrator connected to said pulse width detector and responsive to the trigger pulse therefrom to provide an energizing pulse to said solenoid.

5. In a dispensing system as set forth in claim 1 including card handling means for transporting an encoded card through the opened entry gate into the dispensing system.

6. In a dispensing system as set forth in claim 1 wherein said card sensor includes a magnetic flux detector responsive to the rate of change of magnetic flux produced by an encoded card moving through the receiving throat.

7. In a dispensing system wherein a manually inserted magnetically encoded card actuates a dispensing mechanism, the combination comprising:
   a magnetic card sensor located at a receiving throat of a dispensing system, the sensor being responsive to the rate of change of magnetic flux from a magnetically encoded card manually inserted through said throat to generate a dynamic card signal,
   a level detector responsive to the card signal and generating an output pulse having a time duration directly related to the rate of change of magnetic flux at said card dispenser,
   means for adjusting the level of card signal to said level detector for generating an output pulse,
   a pulse width detector connected to the level detector and responsive to an output therefrom to generate a trigger pulse when the output of said level detector exceeds a preset time duration,
   circuit means responsive to the trigger pulse from said pulse width detector for generating a gate entry signal,
   an entry gate at said receiving throat restricting the manual insertion of an encoded card into the dispensing system when in a closed position and passing a card into said system when in an open position as achieved in response to a dynamic sensing of the card movement relative to the card sensor, and
   motor means coupled to said entry gate and energized by said gate entry signal to operate said gate between the closed and opened positions thereof to thereby open a passage into a card transport of the dispensing system.

8. In a dispensing system as set forth in claim 7 including card handling means for transporting the encoded card from said opened entry gate for delivery into the dispensing system.

9. In a dispensing system as set forth in claim 7 wherein said card sensor includes a magnetic flux detector responsive to the rate of change of magnetic flux generated by the movement of an encoded card through the receiving throat.

10. In a dispensing system wherein a manually inserted magnetically encoded card actuates a dispensing mechanism, the combination comprising:
   a card sensor at a receiving throat of the dispensing system responsive to the rate of change of magnetic flux from a magnetically encoded card manually inserted through said throat to generate a dynamic card entry signal,
   an amplifier connected to said card sensor and responsive to the generated signal to produce an output at a level that varies as a function of the speed of the manually inserted encoded card through the receiving throat,
   a level detector responsive to the output of said amplifier and generating an output pulse having a time duration directly related to the rate of change of magnetic flux at said card sensor,
   means for adjusting the level of said level detector to vary the time duration of the generated output pulse, a pulse width detector connected to said level detector and responsive to the output thereof to generate a trigger pulse when the output of said detector exceeds a preset time duration, an entry gate at the receiving throat restricting the manual insertion of the encoded card into the dispensing system when in a closed position and passing a card into said system when in an open position as achieved in response to a dynamic sensing of the card movement relative to the card sensor, and motor means coupled to said entry gate and responsive to said trigger pulse to operate said gate between the closed and opened positions thereof to thereby open a passage into a card transport of the dispensing system.

* * * * *